(12) United States Patent
Clar

(10) Patent No.: US 7,190,328 B1
(45) Date of Patent: Mar. 13, 2007

(54) THREE-DIMENSIONAL DISPLAY

(76) Inventor: James Clar, 20 Park View La., Watertown, WI (US) 53094

( * ) Notice: Subject to any disclaimer, the term of this patent is extended or adjusted under 35 U.S.C. 154(b) by 103 days.

(21) Appl. No.: 11/125,817

(22) Filed: May 9, 2005

Related U.S. Application Data

(60) Provisional application No. 60/569,302, filed on May 7, 2004.

(51) Int. Cl.
*H01R 12/00* (2006.01)
(52) U.S. Cl. ............................ 345/6; 349/74; 349/149; 345/204; 345/208; 345/55; 345/43; 174/260; 174/261; 361/772
(58) Field of Classification Search ............... 439/74, 439/75, 928; 349/74, 149–152; 345/6, 204, 345/205, 208–213, 55, 43; 362/252; 174/260, 174/261; 361/772–776
See application file for complete search history.

(56) References Cited

U.S. PATENT DOCUMENTS

| | | | | |
|---|---|---|---|---|
| 4,134,104 A | * | 1/1979 | Karras | ............................ 345/6 |
| 4,719,585 A | | 1/1988 | Cline et al. | |
| 5,801,666 A | * | 9/1998 | MacFarlane | ................... 345/6 |
| 5,857,858 A | * | 1/1999 | Gorowitz et al. | ............. 439/86 |
| 6,054,817 A | * | 4/2000 | Blundell | ..................... 315/375 |
| 6,265,842 B1 | * | 7/2001 | Hard et al. | .................. 318/466 |
| 6,469,901 B1 | * | 10/2002 | Costner | ...................... 361/730 |
| 6,636,000 B2 | * | 10/2003 | Asami et al. | ............ 315/169.3 |
| 6,721,023 B1 | | 4/2004 | Weiss et al. | |
| 2002/0067467 A1 | | 6/2002 | Dorval et al. | |
| 2002/0186820 A1 | | 12/2002 | Saito et al. | |
| 2003/0223043 A1 | | 12/2003 | Yoshino | |
| 2004/0070583 A1 | | 4/2004 | Tsai et al. | |
| 2004/0075658 A1 | | 4/2004 | Goto | |
| 2005/0033125 A1 | * | 2/2005 | Miyazaki et al. | ........... 600/300 |

* cited by examiner

*Primary Examiner*—Gary F. Paumen
(74) *Attorney, Agent, or Firm*—Carr & Ferrell LLP

(57) ABSTRACT

A system and method provides an electrical contact assembly for an optical device useable in a three-dimensional optical display. The assembly includes a first conductor comprising a first intermediate section that includes a first contact for connecting to a contact of the optical device, where a first and second pair of tabs extend outwardly in opposite directions from the first intermediate section. The assembly also includes a second conductor comprising a second intermediate section including a second contact for connecting to an other contact of the optical device, where a third pair of tabs extend outwardly in opposite directions to the second intermediate section. The first and second conductors are positioned relative to each so that the first and second pair of tabs, and the third pair of tabs each extend in a different plane. The tabs are connected to tabs of other assemblies for creating a three-dimensional display.

28 Claims, 15 Drawing Sheets

THREE-DIMENSIONAL DISPLAY

CROSS-REFERENCE TO RELATED APPLICATIONS

The present application claims the benefit under 35 U.S.C. § 119(e) from provisional patent application No. 60/569,302, filed May 7, 2004, which is incorporated by reference herein in its entirety.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The present invention relates to a three-dimensional display, addressing therefor and generation of two- and three-dimensional images.

SUMMARY

Embodiments of the invention provide a three-dimensional display and addressing therefor. Methods, assemblies and devices are provided in accordance with embodiments of the inventions for arranging the optical devices and forming an addressable conductor system therefor, and for addressing the optical devices in the display and for providing dynamic and/or static two- and/or three-dimensional images.

According to embodiments of the invention, optical devices are arranged in groups which together define a three-dimensional space. In these embodiments, one contact of each of the optical devices in a group is connected to a common, addressable conductor, and the other contact of each optical device in a group is connected to an individually addressable conductor (with respect to the optical devices of the group). In one embodiment, the other contact of optical devices in different groups are interconnected in groups.

Embodiments of the invention provide conductor assemblies to which the optical devices of a three dimensional display are connected. In one embodiment, the optical devices are arranged in groups with the optical devices of each group extending in a different parallel plane. In one embodiment, one contact of each optical device in a group is connected to a common conductor. In one embodiment, the common conductor comprises an individual conductor connected to a contact for each optical device, with the individual conductors interconnected to form the conductor. In this embodiment, the individual conductors of a common conductor are interconnected to extend in a plane parallel to the plane in which a related group of optical devices extends.

The other contact of each optical device in a group is connected to another conductor, which is addressable separately from the common conductor of the group. In this embodiment, the other contacts of the optical devices in different planes are connected in groups. For example, each such group of interconnected other contacts may extend along a different line, e.g., lines orthogonal to the planes of the common conductors. In one embodiment, the individual line conductors each comprises an individual conductor connected to the other contact for each optical device, with the individual conductors interconnected to form a conductor extending along a line which in one embodiment is orthogonal to the plane of each of the common conductors.

In an embodiment of the invention, an assembly of conductors is provided connected to the contacts of the optical devices. The assembly according to one embodiment comprises conductors extending to define different planes and the three dimensions of the display.

In an embodiment of the invention, the assembly comprises conductors extending in a plurality of parallel planes, with a plurality of associated optical devices per plane arranged parallel to each plane and with the conductors in each plane being connected to one contact of each optical device associated with that plane. The assembly also includes a plurality of conductors each of which is connected to an optical device. The assembly comprises a first conductor, e.g., a common conductor, and second conductor, e.g., an individually addressable conductor (with respect to the optical devices in a plane), positioned orthogonally with respect to each other.

According to another embodiment of the present invention, an electrical contact assembly for an optical device useable in a three-dimensional optical display is provided. The assembly comprises a first conductor including a first intermediate section; a first contact, adapted to connect to a contact of the optical device, associated with the first intermediate section; a first pair of tabs extending outwardly in opposite directions with respect to the first intermediate section; and a second pair of tabs extending outwardly in opposite directions with respect to the first intermediate section, whereby the first and second pair of tabs are spaced about the periphery of the first intermediate section. The assembly also comprises a second conductor including a second intermediate section; a second contact, adapted to connect to an other contact of the optical device, associated with the second intermediate section of the second conductor; and a third pair of tabs extending outwardly in opposite directions with respect to the second intermediate section, where the first and second conductors are positioned relative to each other so that the first and second pair of tabs, and the third pair of tabs each extend in a different plane and each defines a dimension of the three-dimensional display. The first and second contacts are positioned to receive the contacts of the optical device and the tabs are adapted to be connected to tabs of other contact assemblies, whereby the three-dimensional display can be fabricated.

According to another embodiment of the present invention, the optical device comprises a light emitting diode (LED) and/or a liquid crystal display (LCD) device.

According to another embodiment of the present invention, the first and second pair of tabs are positioned within a first plane, and, the third pair of tabs are positioned within a second plane.

According to another embodiment of the present invention, the first and second pair of tabs are electrically conductive and are coupled to an other first and second pair of tabs within the first plane.

According to another embodiment of the present invention, the third pair of tabs are electrically conductive and are coupled to an other third pair of tabs within the second plane, whereby the first and the second plane are substantially orthogonal with respect to one another.

According to another embodiment of the present invention, an electrical contact assembly for an optical device useable in a three-dimensional optical display is provided. The electrical contact assembly comprises a first conductor including a first intermediate section defining a space which is partially enclosed by the intermediate section; a first contact, adapted to connect to a contact of the optical device, associated with the first intermediate section; a first pair of tabs extending outwardly in opposite directions with respect to the first intermediate section; and a second pair of tabs extending outwardly in opposite directions with respect to the first intermediate section, whereby the first and second pair of tabs being spaced about the periphery of the first intermediate section. The assembly also comprises a second conductor comprising a second intermediate section defining a space which is partially enclosed by the second intermediate section; a second contact, adapted to connect to another contact of the optical device, associated with the second intermediate section of the second conductor; and a third pair of tabs extending outwardly in opposite directions with respect to the second intermediate section, where the first and second conductors are positioned relative to each other so that the first and second pairs of tabs, and the third pair of tabs each extend in a different plane and each defines a dimension of the three-dimensional display. The first and second contacts are positioned to receive the contacts of the optical device, and the tabs are adapted to be connected to tabs of other contact assemblies, whereby the three-dimensional display can be fabricated.

According to another embodiment of the present invention, the optical device comprises a light emitting diode (LED) and/or a liquid crystal display (LCD) device.

According to another embodiment of the present invention, an assembly for creating a three-dimensional display comprises a first conductor including a first and a second tab separated by a first intermediate section therebetween. A third and forth tab separated by a second intermediate section is provided therebetween, where the first and second intermediate section comprise a common intermediate section and the first and second tab are substantially perpendicular to the third and fourth tab. The first and fourth tab are separated by an opening. A second conductor including a fifth and a six tab is separated by a third intermediate section, where the second conductor is substantially perpendicular with respect to the first conductor such that the third intermediate section passes between the opening. The first and second conductors of the assembly each form an electrical connection for activating one or more illumination sources.

According to another embodiment of the present invention, the common intermediate section comprises at least one first contact for receiving one or more first conductive pins associated with the one or more illumination sources, and the third intermediate section comprises at least one second contact for receiving one or more second conductive pins also associated with the one or more illumination sources, where the one or more illumination sources receive electrical current through the first and second contacts.

According to another embodiment of the present invention, the one or more illumination sources comprises a device for generating visual light, such as a light emitting diode (LED).

According to another embodiment of the present invention, the first intermediate section comprises at least one first contact for receiving one or more first conductive pins associated with the one or more illumination sources, and the third intermediate section comprises at least one second contact for receiving one or more second conductive pins associated with the one or more illumination sources, where the one or more illumination sources receive electrical current through the first the second contacts.

According to another embodiment of the present invention, the second intermediate section comprises at least one first contact for receiving one or more first conductive pins associated with the one or more illumination sources, and the third intermediate section comprises at least one second region for receiving one or more second conductive pins associated with the one or more illumination sources, where the one or more illumination sources receive electrical current through the first and second contacts.

According to another embodiment of the present invention, the first and second conductor are each electrically conductive.

According to another embodiment of the present invention, the first conductor and the second conductor are electrically isolated from each other.

According to another embodiment of the present invention, the first, second, third, and forth tab each comprise an end portion for connectively coupling an other first conductor to the end portion of one of the first, second, third, or forth tab of the first conductor, wherein the connectively coupled end portion provides electrical conductivity.

According to another embodiment of the present invention, the fifth and sixth tab each comprise an other end portion for connectively coupling another second conductor to the other end portion of one of the fifth or sixth section of the second conductor, where the connectively coupled other end portion provides electrical conductivity.

According to another embodiment of the present invention, a casing is provided for diffusing light generated by the one or more illumination sources, whereby the casing is attached to the first conductor.

According to another embodiment of the present invention, a casing is provided for diffusing light generated by the one or more illumination sources, wherein the casing is attached to the second conductor.

According to another embodiment of the present invention, a method of connecting a plurality of illumination sources in a three dimensional display is provided. The method comprises providing an electrically conductive first conductor located in a first plane for coupling to at least one first connection of an electrical component. Also, an electrically conductive second conductor located in a second plane is provided for coupling to at least one second connection of the electrical component. A first end portion associated with the first conductor is coupled to another first end portion associated with another first conductor adjacent the first conductor, and a second end portion associated with the second conductor is coupled to another second end portion associated with another second conductor adjacent the second conductor.

According to another embodiment of the present invention, the first and second planes are substantially orthogonal.

According to another embodiment of the present invention, the electrical component is activated by applying electrical signals to the first and second conductor.

According to another embodiment of the present invention, the coupled first conductor and the adjacent other first conductor comprise an electrically conductive relationship.

According to another embodiment of the present invention, the coupled second conductor and the adjacent other second conductor comprise an electrically conductive relationship.

According to another embodiment of the present invention, a system for activating at least one illumination device associated with a three-dimensional display comprises a plurality of illumination devices each including a first and a second conductor. The system comprises a first address line conductor coupled to a first plurality of illumination devices located within a first plane, where the first conductor associated with each of the first plurality of illumination devices located within the first plane are interconnected and coupled to the first address line conductor. The system also comprises a second address line conductor coupled to a second plurality of illumination devices located within a second plane, where the first conductor associated with each of the second plurality of illumination devices located within the second plane are interconnected and coupled to the second address line conductor. A plurality of third address line conductors are coupled to the second conductor associated with the first and the second plurality of illumination devices, where the second conductor associated with each of the first plurality of illumination devices is connected to the second conductor associated with each of the second plurality of illumination devices that are orthogonally positioned with respect to the first and second plane.

According to another embodiment of the present invention, the first conductor associated with each of the first and second plurality of illumination devices includes a first contact, and the second conductor associated with each of the first and second plurality of illumination devices includes a second contact.

According to another embodiment of the present invention, each of the first and second plurality of illumination devices comprises an illumination source, whereby applying an electrical signal between the first and second contact activates the illumination source.

According to another embodiment of the present invention, the illumination source or device is, for example, a light emitting diode (LED).

According to another embodiment of the present invention, a method of generating images using a three-dimensional display comprising a plurality of illumination devices each located within a plane is provided. The method comprises receiving first electrical signals at a first plurality of illumination devices within a first plane, where the received first electrical signals illuminate a first select series of the first plurality of illumination devices for a first finite time period. Second electrical signals are applied to a second plurality of illumination devices within a second plane, where the received second electrical signals illuminate a second select series of the second plurality of illumination devices for a second finite time period, where the first finite time period occurs before the second finite time period. The received first and received second electrical signals are based on received image data from an image source.

According to another embodiment of the present invention, the image source comprises one or more camera devices.

According to another embodiment of the present invention, the image source comprises one or more data files.

According to another embodiment of the present invention, the received first electrical signals and the received second electrical signals are alternately scanned through the first and second plane respectively based on the image data, wherein the illuminated first select series and second select series of illumination devices generate a visual image.

According to another embodiment of the present invention, the visual image is a three or two-dimensional image.

According to another embodiment of the present invention, the received first electrical signals are applied both to a first conductor coupled to a first electrical contact associated with each of the first plurality of illumination devices in the first plane, and a second conductor coupled to a second electrical contact associated with each of the first plurality of illumination devices, wherein each first conductor associated with each of the first plurality of illumination devices within the first plane are electrically interconnected.

According to another embodiment of the present invention, the received second electrical signals are applied both to a third conductor coupled to a third electrical contact associated with each of the second plurality of illumination devices in the second plane, and a fourth conductor coupled to a fourth electrical contact associated with each of the second plurality of illumination devices, wherein each third conductor associated with each of the second plurality of illumination devices within the second plane are electrically interconnected, and, wherein each fourth conductor associated with each of the second plurality of illumination devices is electrically connected to an orthogonally positioned second conductor associated with each of the first plurality of illumination devices.

BRIEF DISCRIPTION OF DRAWINGS

The invention is illustrated in the figures of the accompanying drawings, which are meant to be exemplary and not limiting, and in which like references are intended to refer to like or corresponding parts.

Figure 2A:
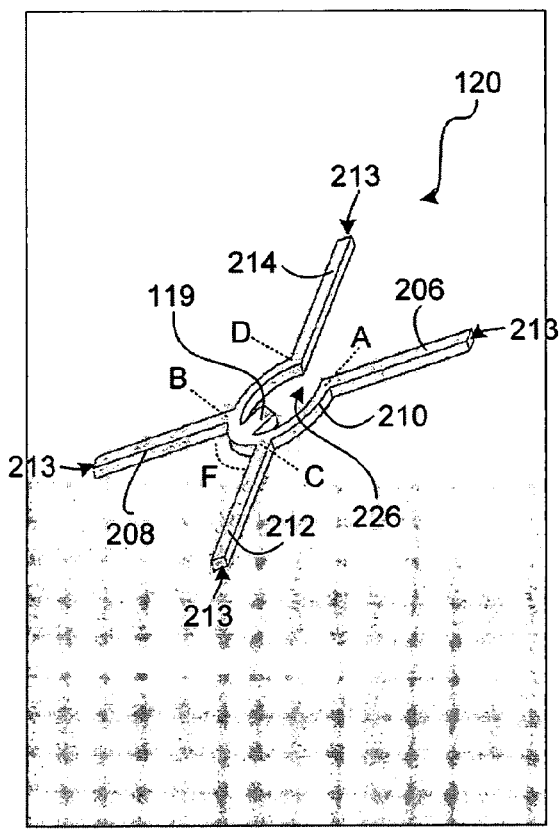
Figure 2B:
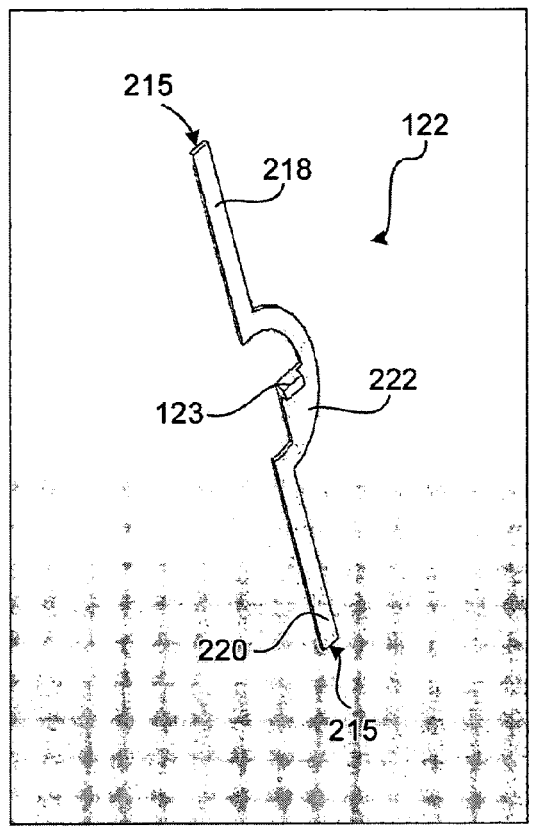
Figure 2C:
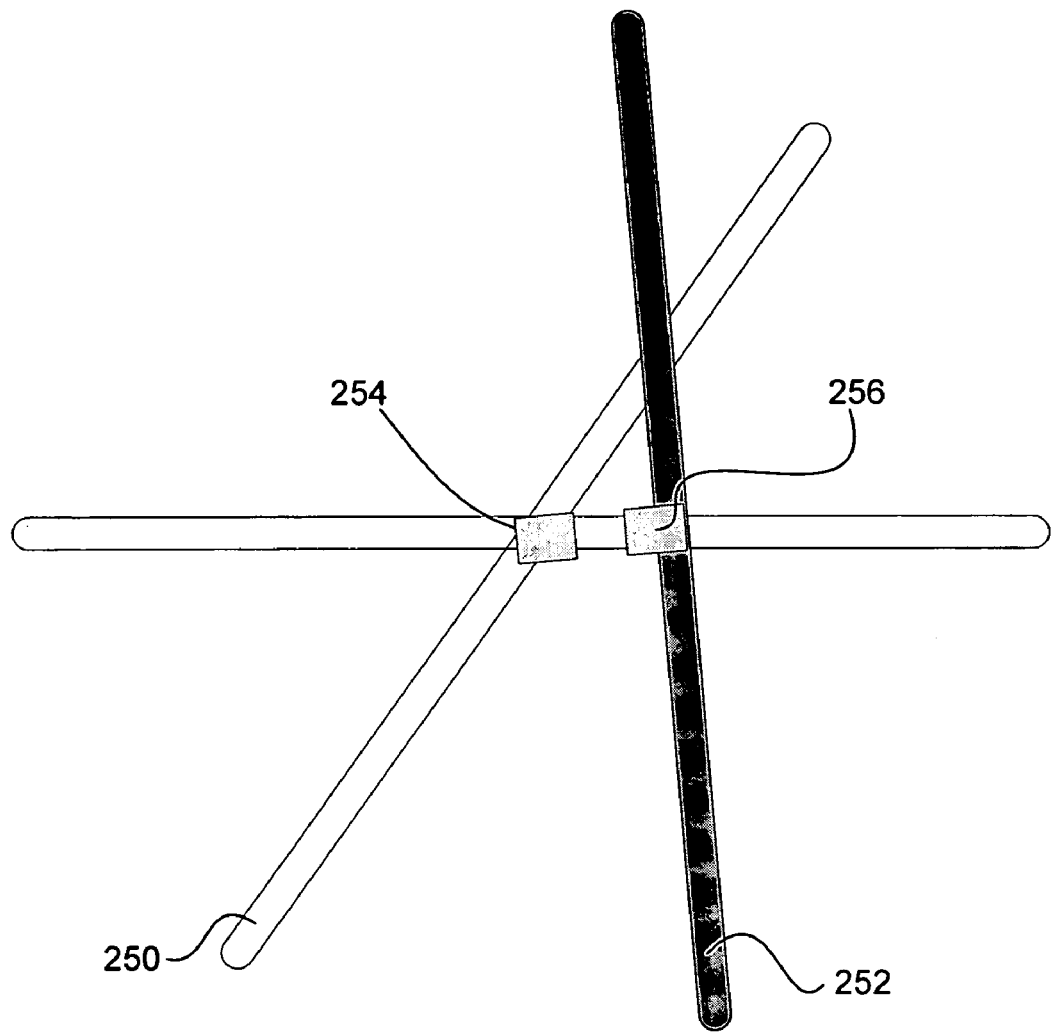
Figure 3B:
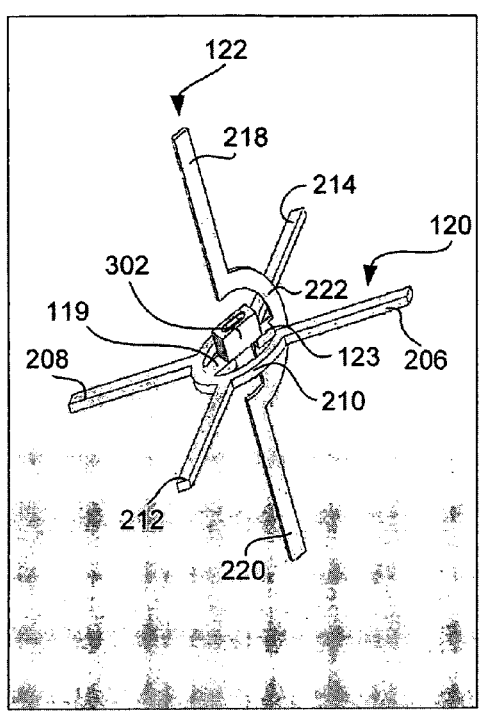
Figure 3A:
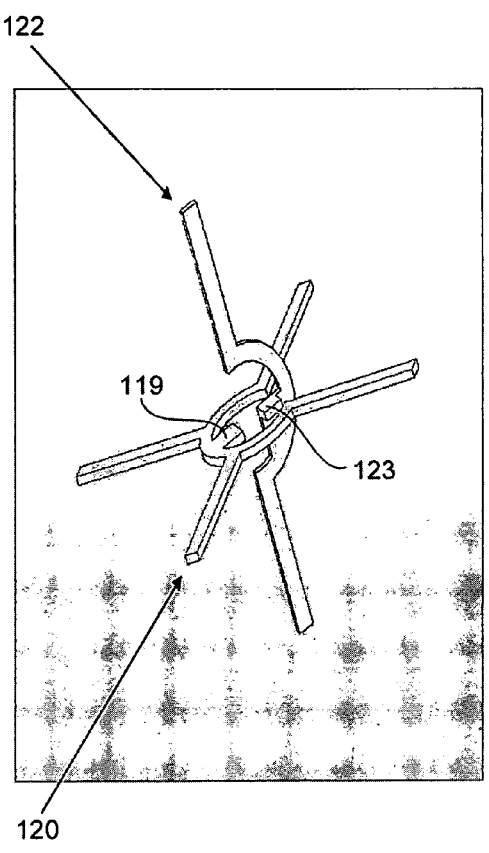
Figure 4B:
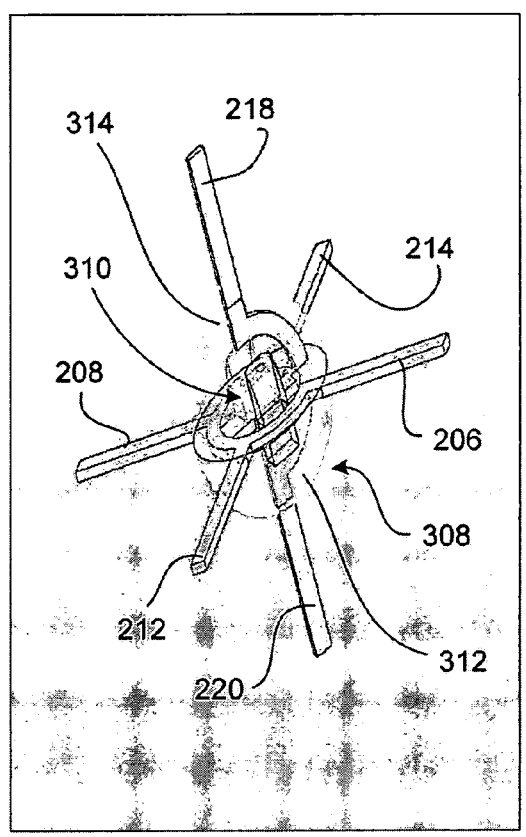
Figure 4A:
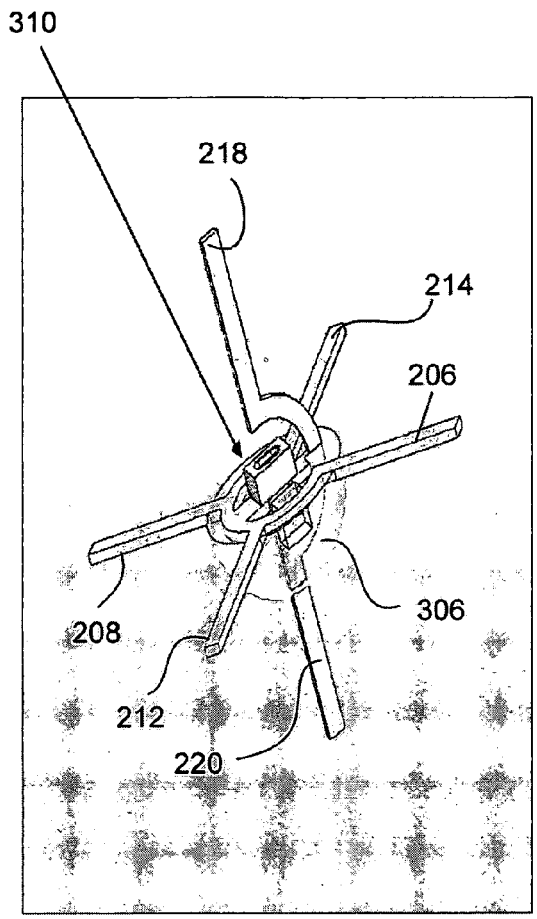
Figure 5:
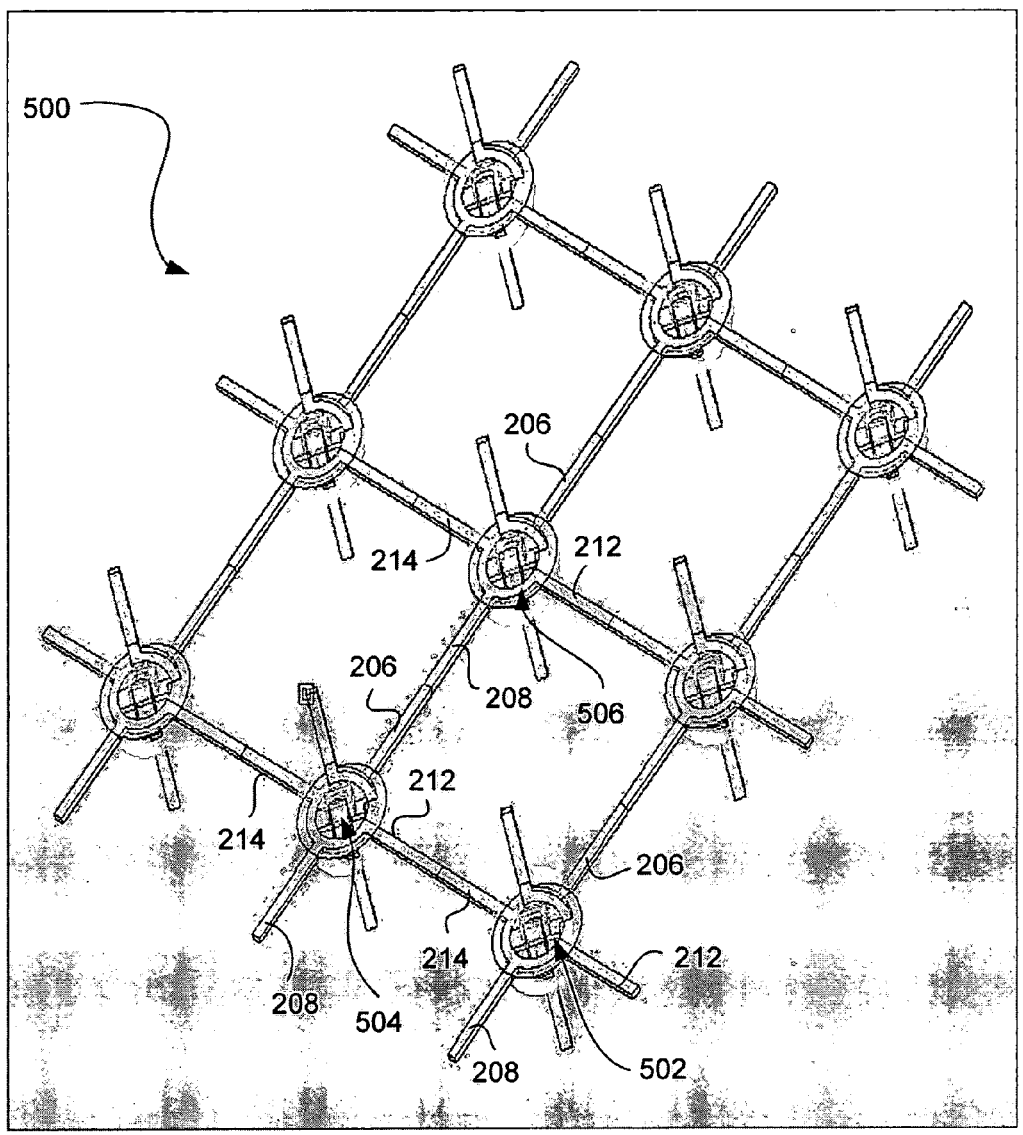
Figure 6:
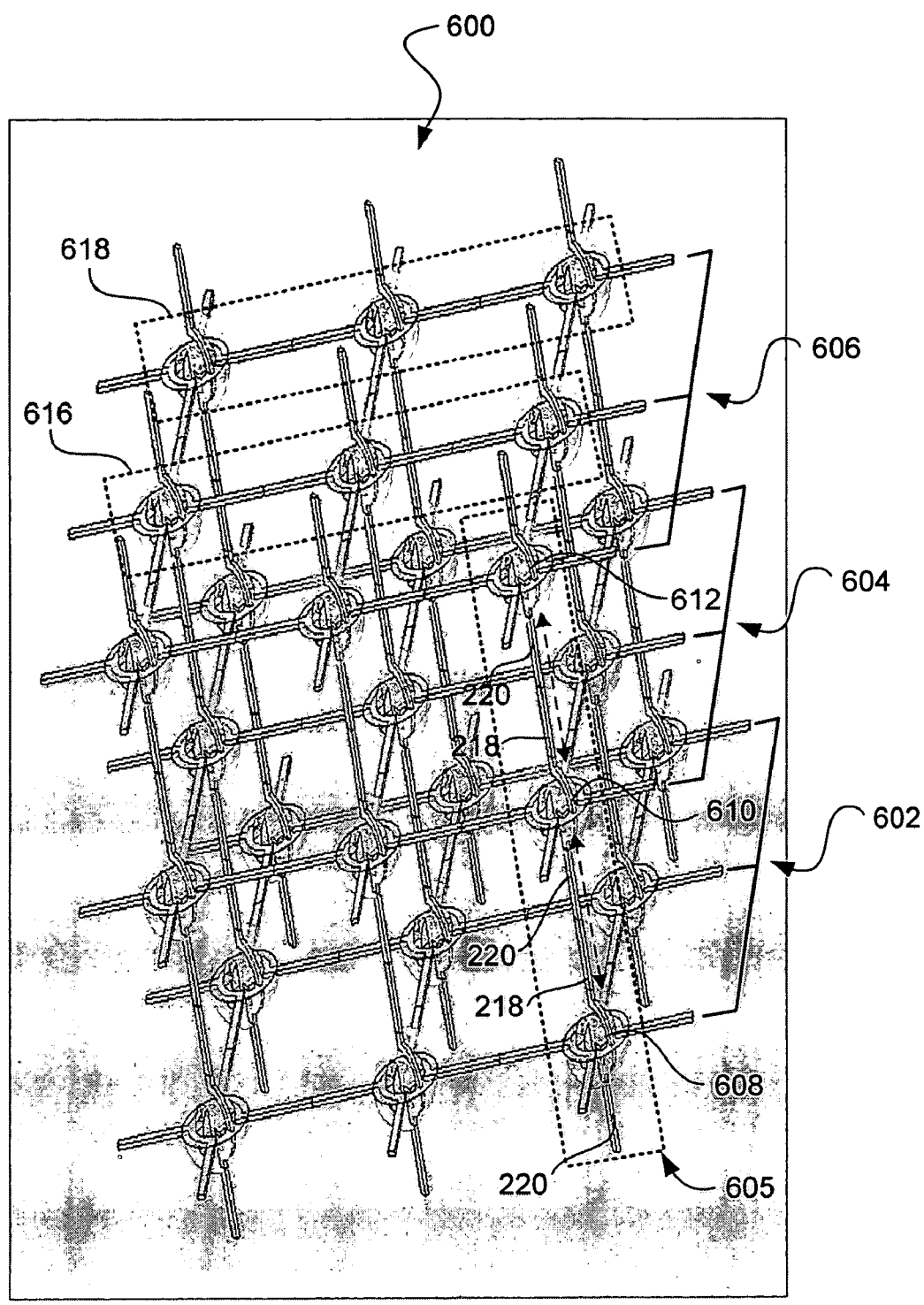
Figure 7A:
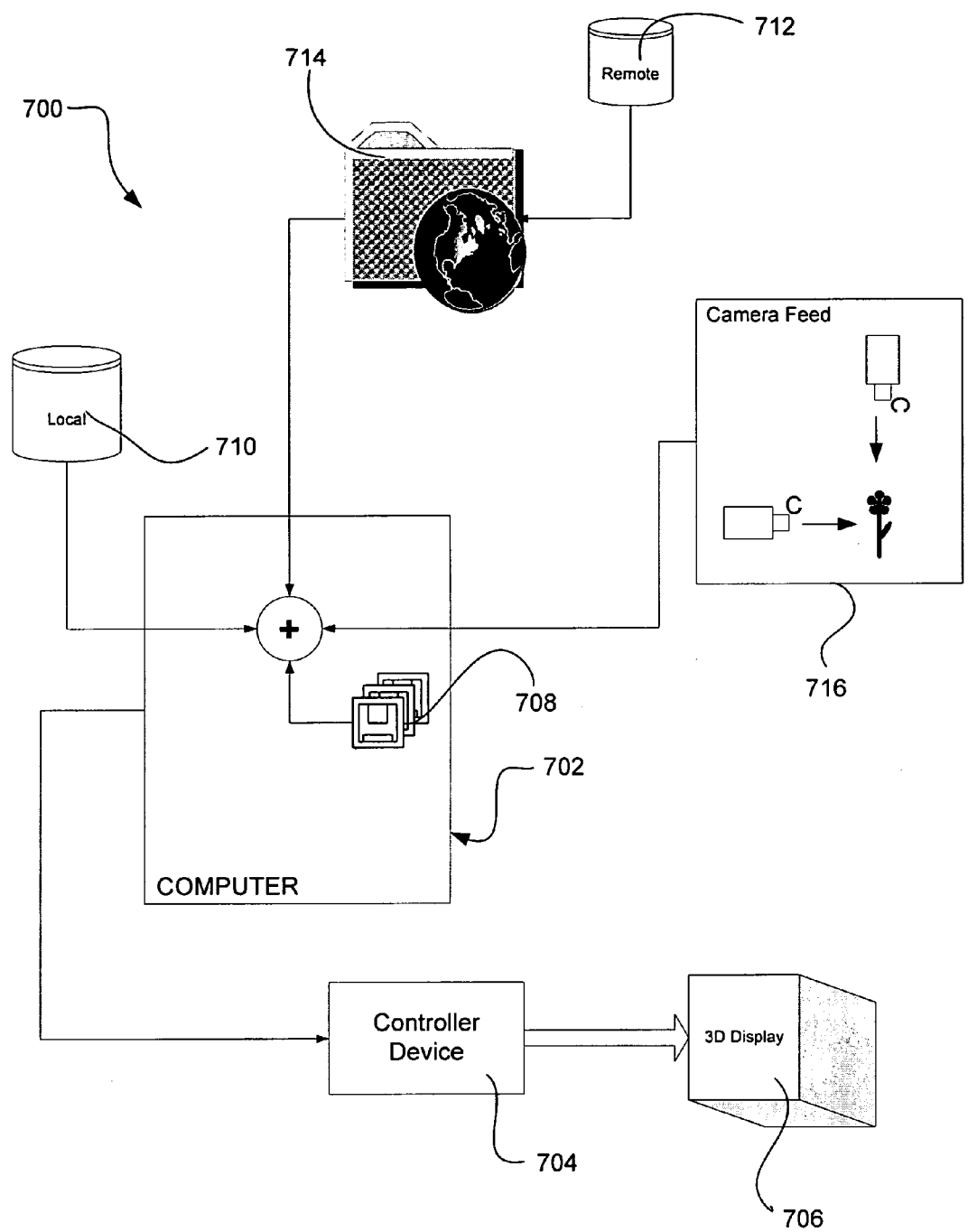
Figure 7B:
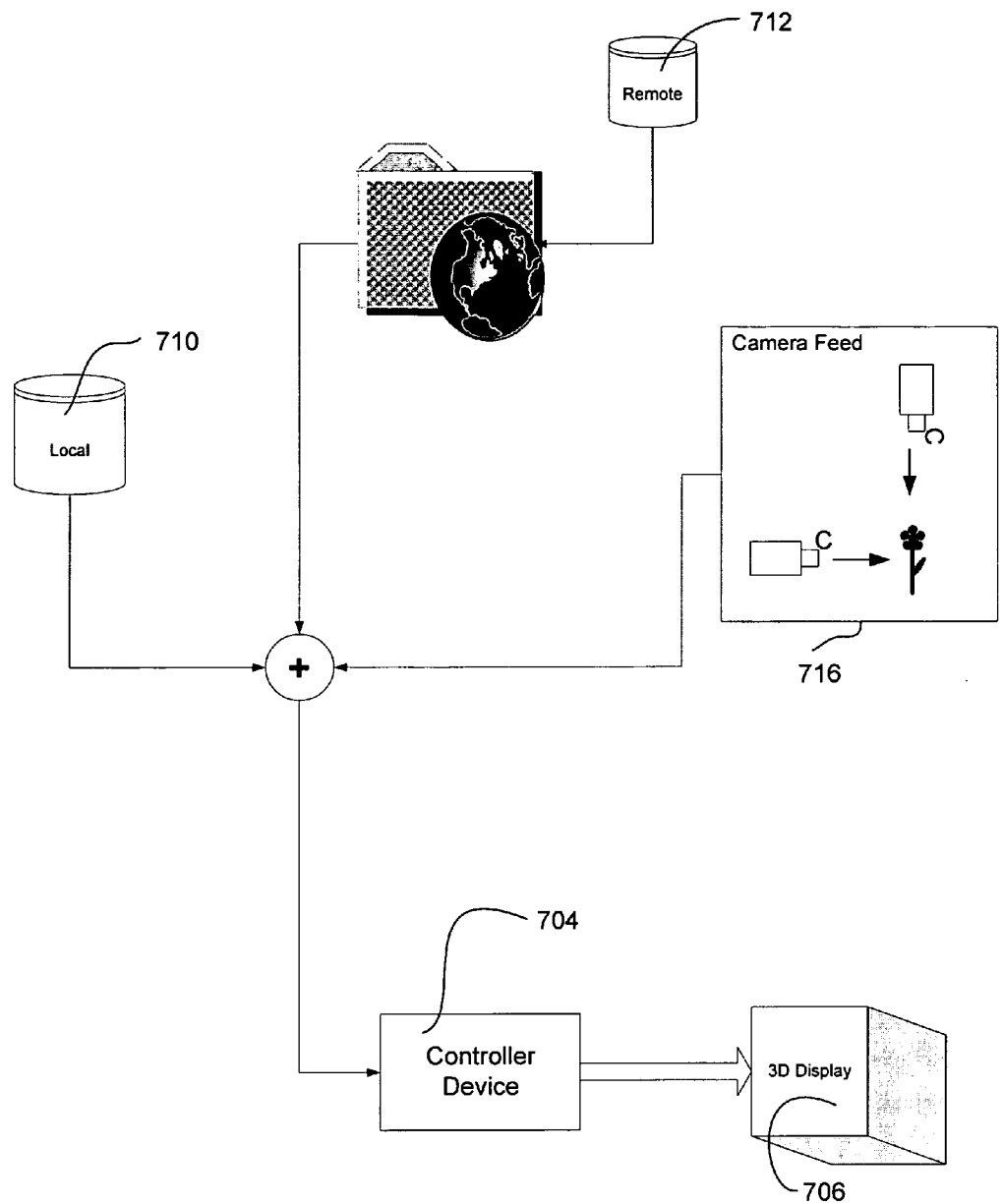
Figure 8:
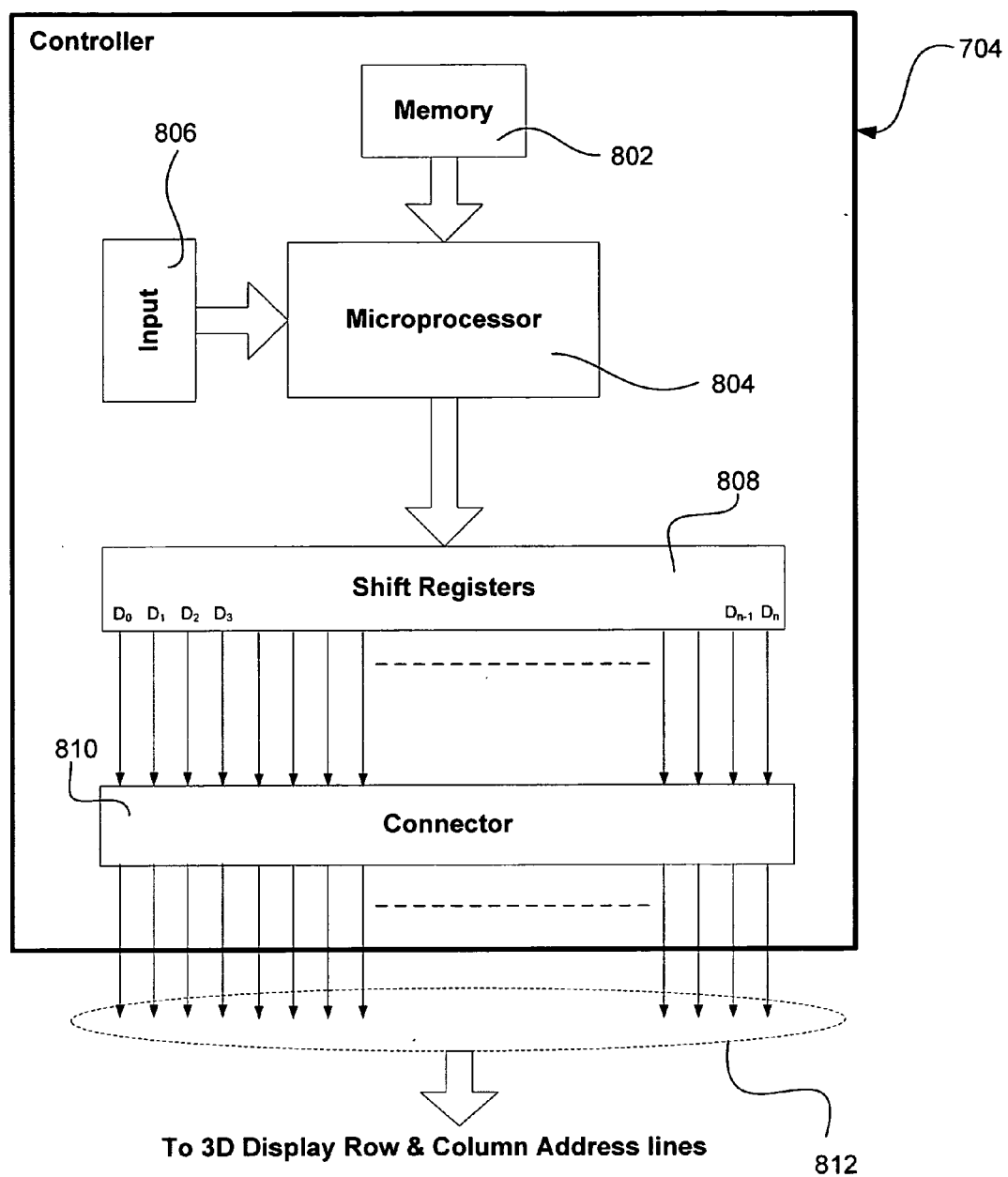
Figure 9:
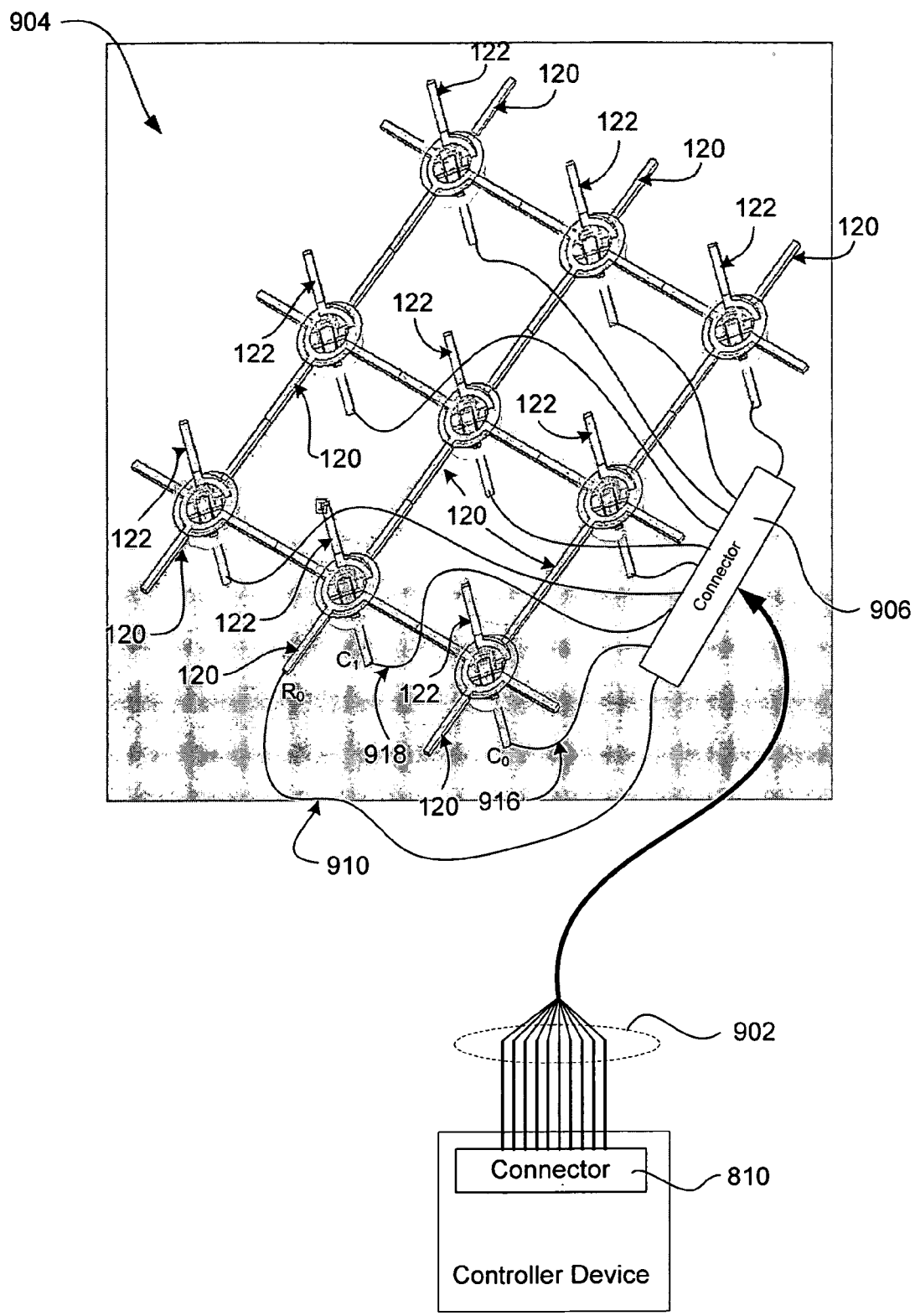
Figure 10:
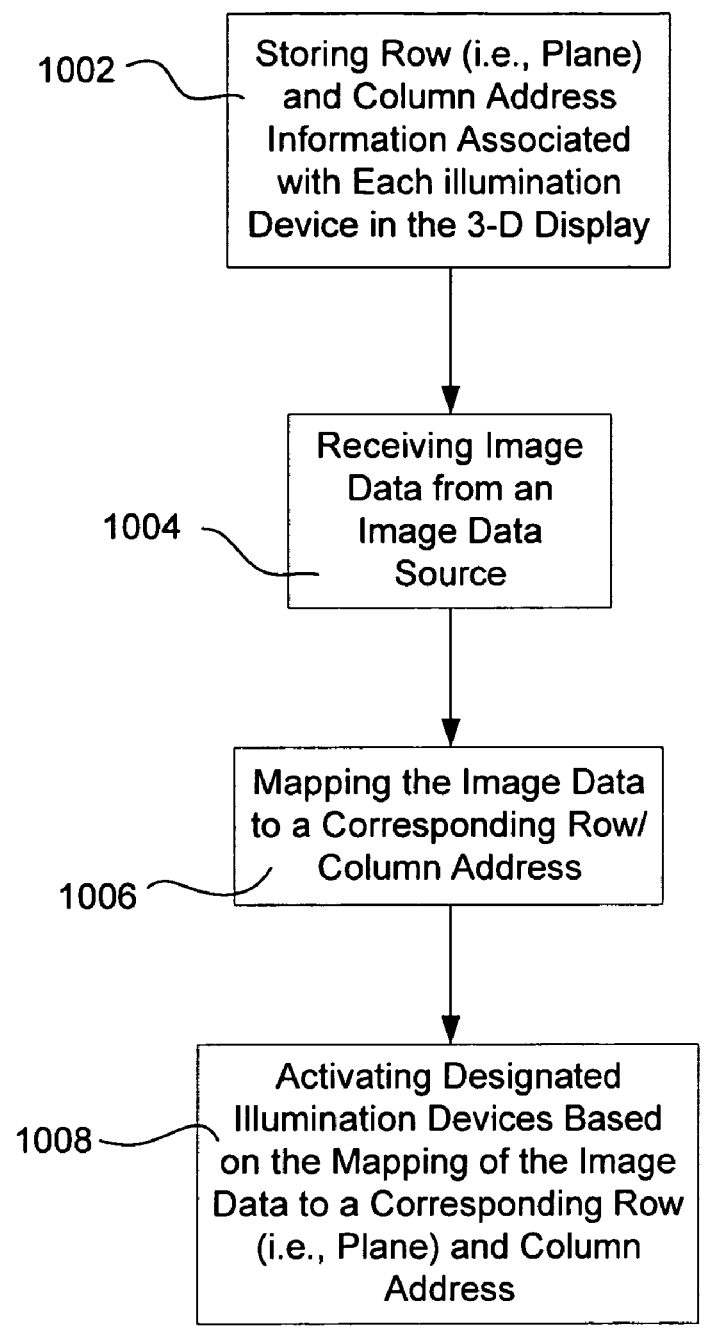
Figure 11:
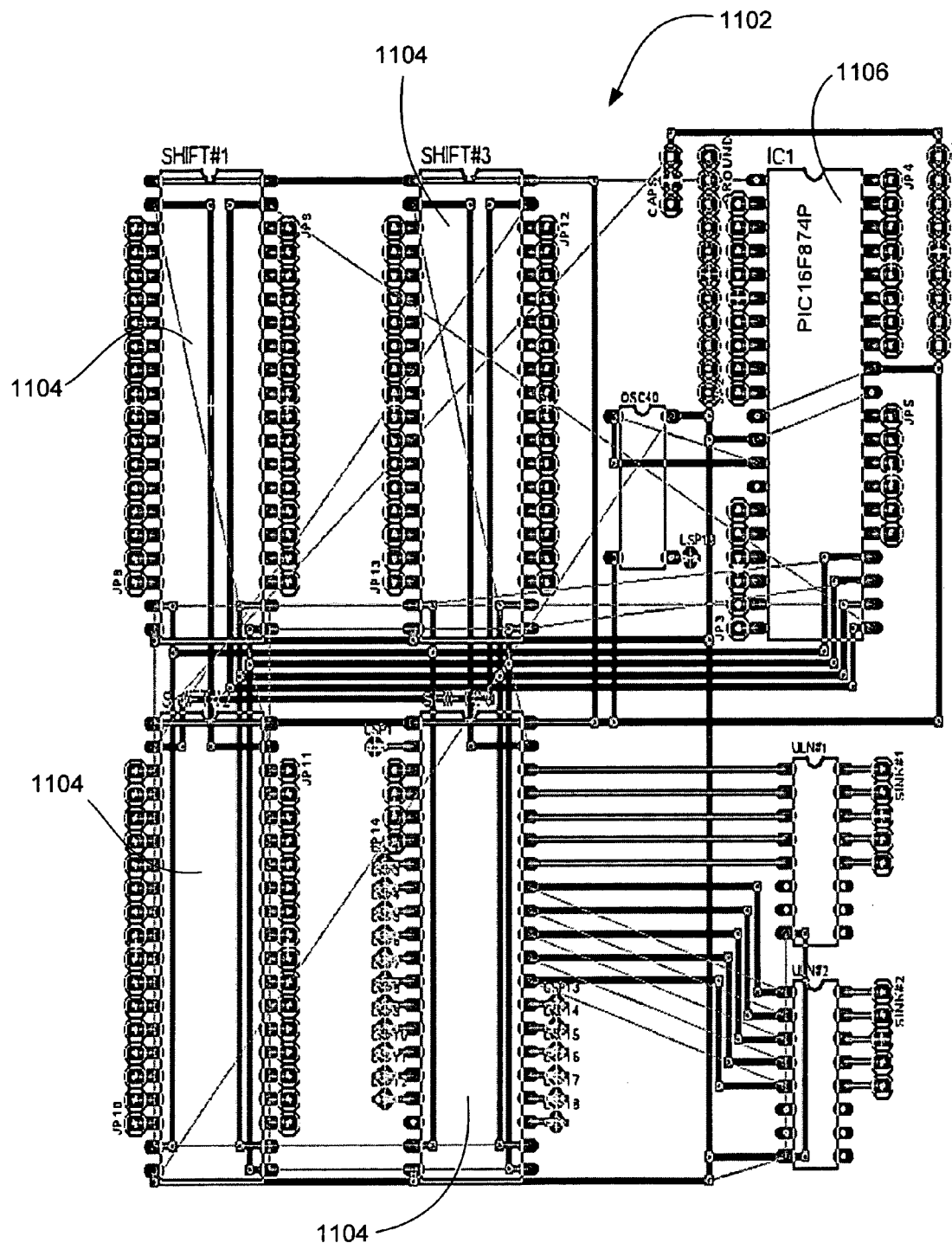

FIGS. 2A, 2B, and 2C are perspective views of first and second conductors associated with an assembly for an illumination device according to an embodiment of the present invention;

FIGS. 3A and 3B are perspective views of an illumination device assembly comprising the first and second conductors components shown in FIGS. 2A and 2B according to an embodiment of the present invention;

FIGS. 4A and 4B are perspective views of the illumination device depicted in FIGS. 3A and 3B, respectively, comprising a spherical casing for providing a visual effect according to an embodiment of the present invention;

FIG. 5 is a perspective view of a plurality of illumination device assemblies depicted in FIG. 4B arranged in a 3×3 plane according to an embodiment of the present invention;

FIG. 6 is a perspective view of a plurality of illumination devices depicted in FIG. 4B arranged in a three dimensional display of a plurality of planes of illumination devices according to an embodiment of the present invention;

FIGS. 7A and 7B are block diagrams illustrating a display system according to an embodiment of the present invention;

FIG. 8 is a block diagram of a controller device according to an embodiment of the present invention;

FIG. 9 is a perspective view illustrating the connectivity between the plurality of electrical connections associated with the controller device and a single plane of illumination devices within a display according to an embodiment of the present invention;

FIG. 10 is a flowchart associated with addressing the three-dimensional display depicted in FIG. 9 according to an embodiment of the present invention; and FIG. 11 is a circuit diagram of a controller device associated with the display system according to an embodiment of the present invention.

Figure 12:
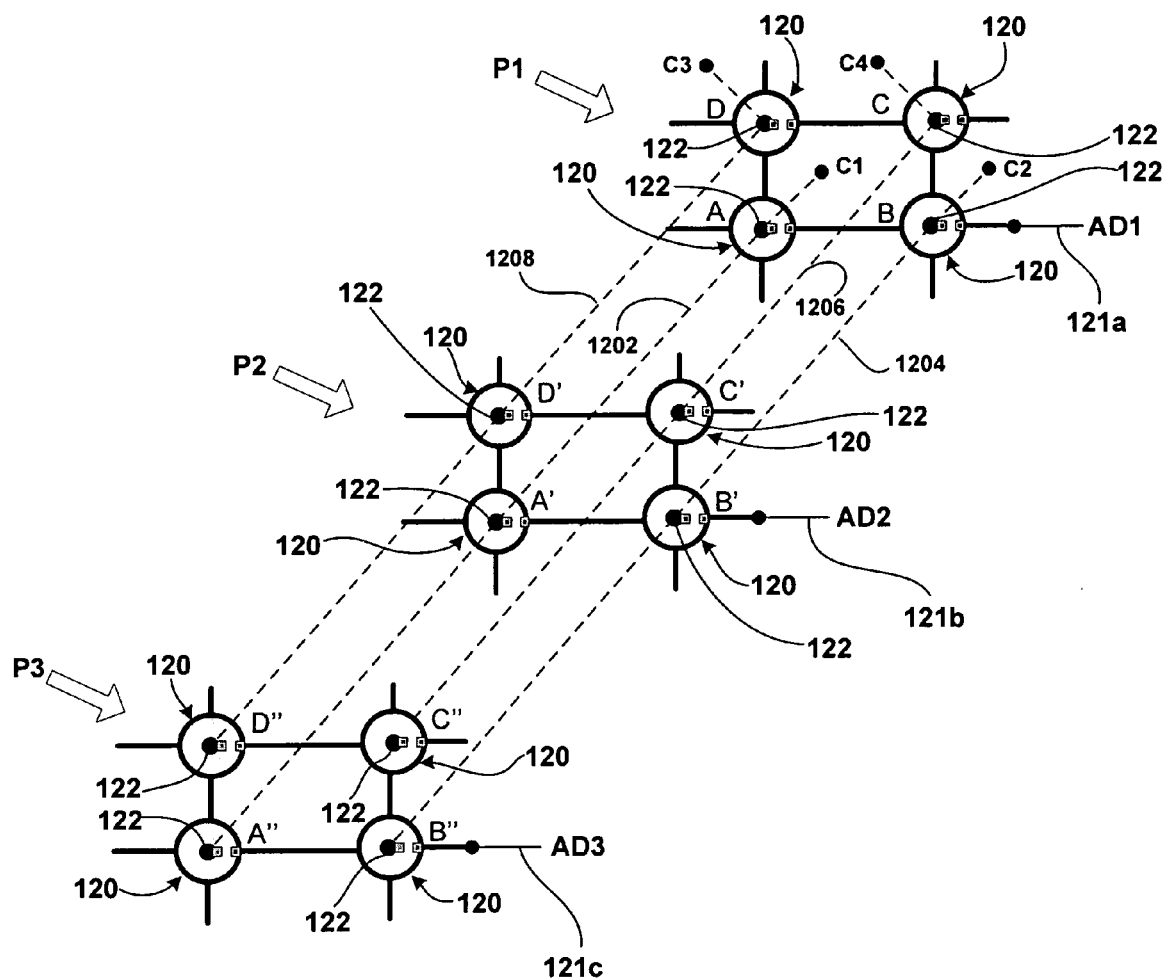

FIG. 12 is a schematic diagram of a portion of a 3D display for creating visual display information based on receiving electrical signals in a scanned manner according to an embodiment of the present invention.

DETAILED DESCRIPTION OF PREFERRED EMBODIMENTS

Figure 1A:
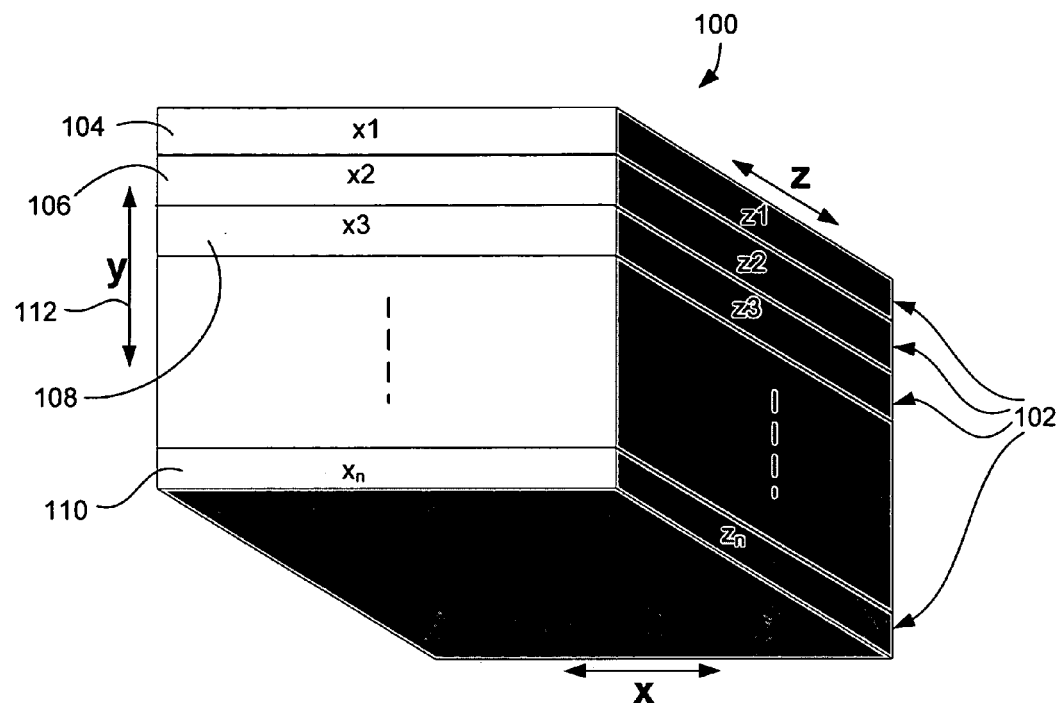
FIG. 1A is a diagram illustrating a three-dimensional (3D) display assembly according to an embodiment of the present invention.

FIG. 1A illustrates a three-dimensional (3D) display assembly according to an embodiment of the present invention. The display assembly comprises a plurality of illumination devices (e.g., see FIGS. 4A and 4B) arranged in a three-dimensional (3D) array 100. The 3D array structure 100 may, for example, be conceptually organized into a plurality of planes 102, such as planes $x_1z_1$ 104, $x_2z_2$ 106, $x_3z_3$ 108, and $x_nz_n$ 110, which have been stacked along a Y-dimension 112.

Figure 1B:
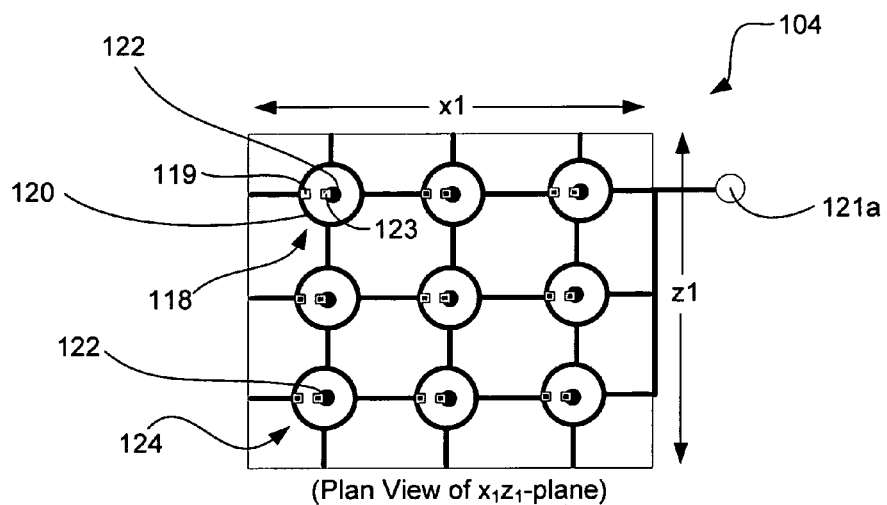
FIG. 1B is a schematic plan view of a plane of conductors for a plurality of illumination devices within the 3D display assembly shown in FIG. 1A according to an embodiment of the present invention.

FIG. 1B schematically depicts plane 104 (i.e., $x_1z_1$) within the 3D array of illumination devices 100 (FIG. 1A) according to an embodiment of the present invention. A plurality of illumination devices, such as a 3×3 configuration of illumination devices, are positioned in plane 104, as shown in FIG. 1B. Each illumination device 118 includes a first conductor 120 and a second conductor 122. Each first conductor 120 comprises a first contact 119 (e.g., +ve contact), and each second conductor 122 includes a second contact 123 (e.g., –ve or ground contact). The first conductor 120 associated with the illumination devices are interconnected and coupled to an address line conductor 121a. The second contact 123 associated with the illumination devices in the plane are, however, not interconnected, and are separately controlled.

For example, by applying a first electrical signal (e.g., +ve voltage signal) to address line conductor 121a of plane 104, the first conductor 120 and first contact 119 associated with all other illumination devices within plane 104 (i.e., $x_1z_1$) will also receive the electrical signal. Once the first electrical signal is applied to the devices in plane $x_1z_1$, which in a sense enable each device in the $x_1z_1$ plane, application of a second electrical signal (e.g., –ve voltage or grounding) to any individual illumination device will activate that illumination device.

An illumination device 118 may comprise, for example, a light emitting diode (LED), a liquid crystal display (LCD), and/or any other material capable of generating a visual characteristic (red, green, or blue light, or combinations thereof) upon receiving one or more electrical signals. For example, once the first conductors 120 of devices 124 in plane 104 receive the first electrical signal, they become enabled, and upon application of the second electrical signal (e.g., negative voltage or ground) to the second conductors 122, a respective device or devices are activated and provide a visual characteristic, e.g., light.

Figure 1C:
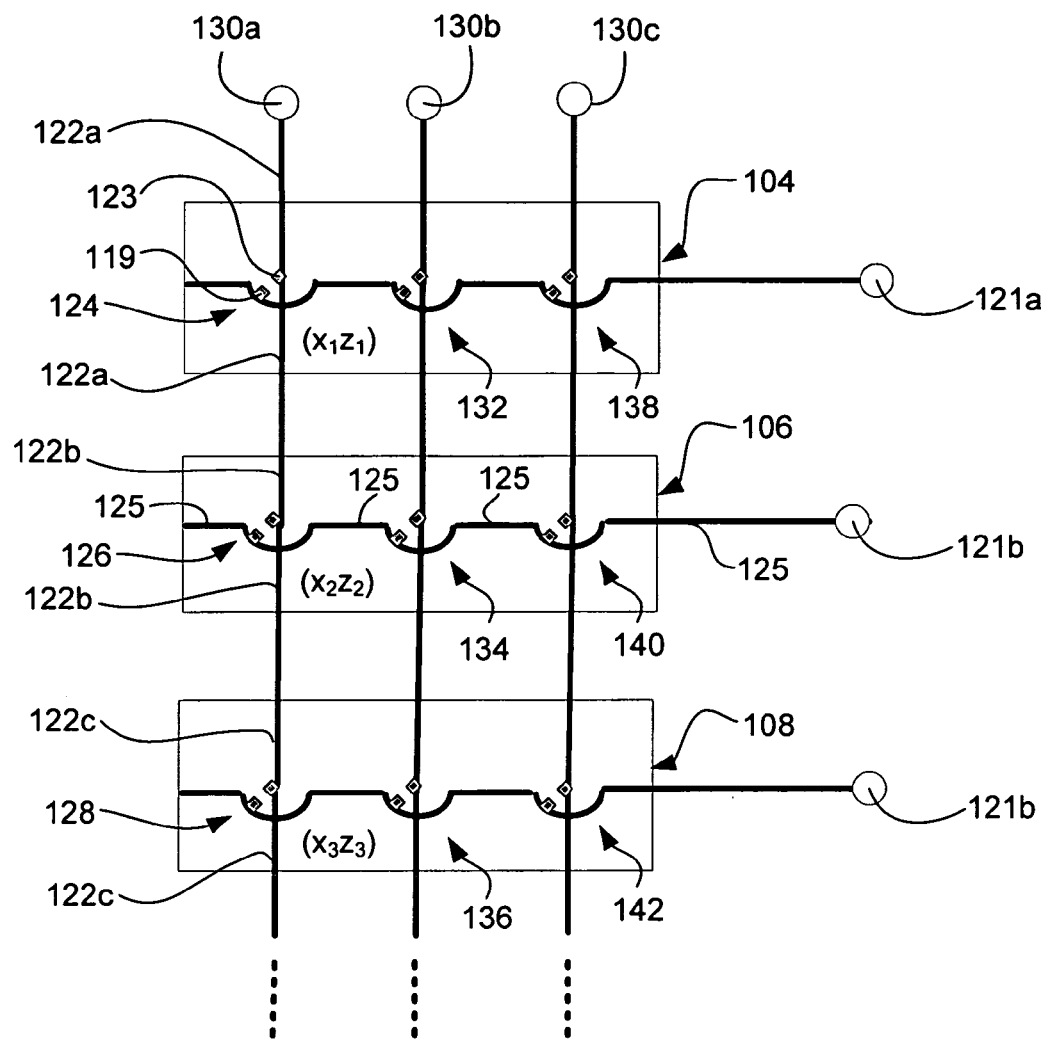
FIG. 1C is a schematic cross-sectional view of the planes of conductors shown within the 3D assembly shown in FIG. 1A according to an embodiment of the present invention.

FIG. 1C schematically depicts planes 104 ($x_1z_1$), 106 ($x_2z_2$), and 108 ($x_3z_3$) within the 3D array of illumination devices 100 (FIG. 1A) according to an embodiment of the present invention. FIG. 1B illustrates the interconnectivity between the illumination devices within each plane, while FIG. 1C illustrates the common connectivity configuration between illumination devices of adjacent planes, e.g., orthogonally positioned. For illustrative purposes and to avoid overcomplicating FIG. 1C, only the connectivity between the first three planes 104, 106, 108 of array 100 (FIG. 1) is shown. For example, as illustrated in FIG. 1C, the second conductor 122a associated with illumination device 124 is connected to corresponding second conductor 122b associated with illumination device 126, which is also connected to second conductor 122c associated with illumination device 128. Thus, illumination devices 124, 126, and 128, which are orthogonally positioned with respect to the planes 104, 106, 108, comprise interconnected second conductors 122a, 122b, and 122c.

For example, applying an electrical signal to address line conductor 130a provides the electrical signal to the second conductors 122a, 122b, 122c associated with illumination devices 124, 126, and 128. Similarly, applying an electrical signal to address line conductor 130b provides the electrical signal to the second conductors associated with illumination devices 132, 134, and 136, and applying an electrical signal to address line conductor 130c provides the electrical signal to the second conductors associated with illumination devices 138, 140, and 142. For example, in order to activate devices 126 and 134, which are located at plane 106, a first electrical signal (e.g., +ve voltage) is applied to address line conductor 120b and a second electrical signal (–ve voltage or ground) is applied to column address line conductors 130a and 130b. As previously described, application of the first electrical signal to address line 120b provides the first electrical signal to all first conductors 125 of the illumination devices in plane 106. However, in order to activate an illumination device in plane 106, a second electrical signal is provided to the column address line (e.g., 130a, 130b, 130c) for that illumination device in plane 106.

Although the plurality of planes illustrated in FIG. 1A are shown to be substantially horizontal, the planes may be conceptually organized according to how a user of the 3D display assembly intends to operate or activate the array of illumination device 100. For example, a plane may be configured to run along the yz-plane, where each of the designated yz-planes may be stacked along the x-dimension. Also, the concept of planes described according to various aspects of the present invention is for purposes of illustrating the physical positioning and operation of the illumination sources within the 3D display, and may not be limited to any particular physical plane or surface.

FIGS. 2A and 2B are perspective views of the first conductor 120 and the second conductor 122 as depicted in FIG. 1B, according to an embodiment of the present invention. First conductor 120 comprises a first tab or arm 206 and a second tab or arm 208 separated by a portion of an intermediate section 210 extending from point A to point B. First conductor 122 also comprises a third tab 212 and a forth tab 214, which is also separated by a portion of intermediate section 210 extending between points C and D. The portion of intermediate section 210, which is common to both the first and second tabs 206, 208 and the third and fourth tabs 212, 214 is designated by region F. Region F includes first contact region 119 for receiving one or more conductive pins associated with a device such as light emitting diode (see FIG. 3B). In addition to an electrical device such as a light emitting diode (LED), other devices that visually react to electrical signals may also be coupled to contact 119. For example, a material that reacts to electrical current, voltage, and/or any electromagnetic signal (e.g., light) may be incorporated within the 3D display system by being coupled to contact 119. Contact 119 may be located along any portion of intermediate section 210. For example, contact 119 may be position anywhere between points A and B, or between points C and D. Conductors 120 and 122 are shown as being substantially horizontal and vertical, respectively. Conductors 120 and 122 may, for example, have various other orientations with respect to one another, provided, each of the conductors 120, 122 are electrically isolated from each other.

Second component 122 comprises first tab or arm 218 and second tab or arm 220, where both tabs are separated by intermediate section 222. Intermediate section 222 includes a second contact 123 for receiving one or more of the other conductive pins associated with the LED or other optical device, where the LED or device may be attached between contacts 119 of conductor 120 and contact 123 of conductor 122. Thus, the optical device (e.g., LED) may be activated by receiving electrical signals on contacts 119 and 123. Contact 119 may receive an electrical signal via any one of tabs 206, 208, 212, or 214. Similarly, contact 123 may receive an electrical signal via any one of tabs 218 or 220.

Tabs 206, 208, 212, and 214 each comprises an end portion 213, which may be connected to the tabs of other first conductors. Similarly, each of tabs 218 and 220 also comprises an end portion 215 for connecting the tabs to other tabs associated with other second conductors. For producing a three-dimensional display, different connectivity methods may be employed for connecting the end portions of the tabs associated with the first and second conductors. For example, the end portions of the tabs may have complementary connectors that couple together according to known methods, or alternatively, they may be soldered. The connectivity means should however provide an electrically conductive connection between the interconnected tabs.

The intermediate section 210 illustrated in FIG. 2A may be any suitable shape and is not limited to the exemplary embodiment illustrated. For example, section 210 may comprise a substantially square, rectangular, triangular, and/or multisided shape. It may also be possible for conductor 120 to not have intermediate section 210. In such an embodiment, tabs 206 and 208 extend toward each other to form a single arm or tab. Similarly, tabs 212 and 214 may extent toward each other to also form a single tab. Thus, component 120 may form a cross like shape based on the intersection of tabs 212, 214, 206 and 208. If first component 120 is formed in such a manner, intermediate section 222 (FIG. 2B) of second conductor 122 may be required to comprise some form of shaping in order to avoid any contact with conductor 120, since these conductors may be required to be electrically isolated when forming an illumination device assembly (see FIG. 3A). Current illustrations provide a symmetrical device assembly, where an illumination source (e.g., light emitting diode) may be connected in the center of the assembly. However, components 120 and 122 may also be adapted to form a less symmetrical assembly, or one without symmetry.

For example, in an alternative embodiment, in addition to the intersection of tabs 212, 214, 206 and 208 (FIG. 2A) of first conductor 120 forming cross shape arms 250 (FIG. 2C), tabs 218 and 220 of conductor 122 (FIG. 2B) may also extent toward each other to form a single arm or tab 252 (FIG. 2C). As illustrated in FIG. 2C, the cross shaped first conductor 250 comprises a first contact 254 for receiving a one or more conductive pins or terminals of an illumination source or optical device (not shown). Conductor 252 also comprises a second contact 256 for receiving one or more other conductive pins or terminals associated with the illumination source or optical device.

FIGS. 3A and 3B are perspective views of an illumination device assembly comprising the first and second conductors 120, 122 depicted in FIGS. 2A and 2B according to an embodiment of the present invention. As illustrated in FIGS. 3A and 3B, opening 226 (FIG. 2A), which is located between tabs 206 and 214 of first conductor 120 (FIG. 2A), provides a means for positioning second conductor 122 (FIG. 2B) with respect to conductor 120, such that contacts 119 and 123 are aligned in manner that enables them to receive an illumination source or optical device such as an LED 302.

As illustrated in FIG. 3B, first conductor 120 comprises intermediate section 210. The intermediate section 210 includes first contact 119 for connecting to one or more contacts associated with the illumination source or optical device. From the intermediate section 210, the first pair 206, 208 and second pair 212, 214 of tabs extend outwardly with respect to intermediate section 210, where the first and second pair of tabs 206, 208, 212, 214 are spaced about the periphery of intermediate section 210. Second conductor 122 comprises second intermediate section 222, where intermediate section 222 includes second contact 123 for connection to one or more other contacts associated with the illumination source (e.g., LED 302). Intermediate section 222 also comprises a third pair of tabs 218, 220 extending outwardly in opposite directions. Conductors 120 and 122 are positioned relative to each other such that contact 119 and 123 are aligned with the pin or terminal connections of LED 302. As illustrated, conductors 120 and 122 are also positioned in substantially orthogonal planes with respect to each other. The intermediate sections 210, 222 of the conductors 120, 122, and their respective positioning, provides electrical isolation between the conductors 120, 122 based on their physical separation.

First and second conductors 120 and 122 convey signals to their respective contacts 119, 123 for activating devices (e.g., optical device) that are coupled between these contacts 119, 123. Therefore, the conductors 120, 122 may comprise any material capable of guiding one or more signals to the device that is attached to the conductors. For example, the conductors 120, 122 may comprise any varying degree of conductivity, such as a conductive, semi-conductive, or insulator type material. For example, based on the use of glass or plastic insular material in the construction of the conductors 120, 122, optical sources (e.g., LED or Laser) may be used to transmit the signal to an optical device (e.g., a light reactive surface) coupled to the contacts of these conductors 120 and 122.

FIGS. 4A and 4B each illustrate a perspective view of the illumination devices depicted in FIGS. 3A and 3B according to an embodiment of the present invention. The illumination devices comprise a casing 306, 308 for providing a visual effect (e.g., diffusing light) based on light that is generated by the LED 310, or any other suitable illumination source. As illustrated in FIG. 3A, casing 306 may comprise a semi-spherical shaped casing for diffusing light that is generated by LED 310. The semi-spherical shaped casing 306 may be coupled to tab 220. Alternatively, casing 306 may also be coupled to tabs 218, 206, 208, 212, or 214. Similarly, as shown in FIG. 3B, casing 308 comprises a spherical shaped casing, which may also diffuse light that is generated by LED 310. Spherical shaped casing 308 may be comprised of two semi-spherical shaped casings 312, 314 that are coupled to tabs 218 and 220, respectively. Alternatively, the two semi-spherical shaped casings 312, 314 may also be coupled to tab pair 206 and 208, or tab pair 212 and 214.

FIG. 5 is a perspective view of a plurality of illumination devices arranged in a 3×3 plane 500 according to an embodiment of the present invention. As previously described, and illustrated in FIG. 5, the tabs or arms 206, 208, 212, 214 associated with each illumination device that is located in plane 500 are interconnected. For example, section 214 of device 502 is coupled to section 212 of device 504; and section 206 of device 504 is coupled to section 208 of device 506. Since the tabs associated with the illumination devices are electrically conductive, applying an electrical signal to any of the tabs (e.g., tabs 208 or 212), will provide the applied electrical signal to all the other tabs associated with the plurality devices in the plane 500.

FIG. 6 is a perspective view of a three-dimensional display 600 comprising a plurality of planes of illumination devices 602, 604, 606 according to an embodiment of the present invention. As illustrated, each plane (e.g., plane 602) is orthogonal with respect to its adjacent plane (e.g., plane 604). FIG. 6, among other things, illustrates the interconnectivity of multiple planes of illumination devices. For example, within vertical column 605, tabs 218 and 220 associated with illumination devices 608, 610, and 612 are interconnected. Similarly, all illumination devices within other vertical columns are also interconnected by the tabs associated with their second conductor 122 (FIG. 2B). As previously described, the second conductor and its respective tabs are electrically conductive. Therefore, for example, applying an electrical signal to tab 220 of device 608, also provides the electrical signal to sections 218 and 220 of devices 610 and 612 within vertical column 605.

FIG. 7A illustrates a block diagram of a display system 700 according to an embodiment of the present invention. Display system 700 may comprise a computer 702, a controller device 704, and a three-dimensional (3D) display 706, such as, but not limited to, the 3D display assembly 600 illustrated in FIG. 6. Computer device 702 receives image files from, for example, local memory 708 associated with computer 702, a local database 710, and/or one or more remotely located databases 712 that may be accessed via a website 714 over the internet. Image data may also be received by computer 708 from one or more cameras 716, where the cameras may generate still image data (e.g., JPEG, TIFF, GIF, BMP etc.) of motion picture image data (e.g., MPEG). A suitable user-interface or application program (not shown) residing on computer 708 enables a user to select any desired image from one or more of the image sources (e.g., local memory, remote database, etc.) in communication with the computer 702. The program may then facilitate the transfer of the selected image to controller device 704, where the controller 704 processes the image data in order to map this data to corresponding locations (i.e., addresses) associated with the illumination devices within the 3D display 706.

The block diagram shown in FIG. 7B is similar to FIG. 7A, except that the controller device 704 may retrieve and receive image data directly from the image sources such as, for example, the local database 710, the one or more remotely located databases 712, and the one or more cameras 716. The retrieved and received data may then be processed and displayed on 3D display 706 according to various aspects of the present invention.

FIG. 8 illustrates a block diagram of the controller device 704 incorporated within the display system of FIGS. 7A and 7B according to an embodiment of the present invention. Controller 704 may comprise memory 802, an input unit 806 for receiving image data, a microprocessor 804 for processing image data that is received from input unit 806 and/or memory 802, a shift register unit 808 for providing electrical signals to the illumination devices within the 3D display, and a connector 810 for coupling the electrical signals to the 3D display. Connector 810 may comprise a plurality of conductors 812 that are coupled to each plane (e.g., FIG. 6, plane 606) and vertical column (FIG. 6, plane 605) within the 3D configuration of illumination devices (e.g., FIG. 6, display 600).

FIG. 9 is a perspective view illustrating an example of the connectivity between the plurality of address line conductors 902 associated connector 810 of the controller (FIG. 8) and a single plane of illumination devices 904 within a display according to an embodiment of the present invention. The plurality of conducts 902 may be coupled to the plane of illumination devices via a connector 906 associated with the 3D display. As illustrated, a single address line conductor 910 may, for example, be used to provide an electrical signal ($R_0$) to all the illumination devices in plane 904, since the first conductors 120 (FIG. 2A) of each of the illumination devices are interconnected. The second conductors 122 associated with the illumination devices each individually receive an electrical signal and may not be interconnected within the same plane. Each second conductor 122 and single interconnected first conductor 120 within plane 904 is controlled by an independent address line conductor that is electrically driven by a single output element (e.g., D-type flip-flop) of the shift register unit 808 (FIG. 8, elements $D_0$–$D_n$). For example, address line 910 drives conductor 120, and, address lines 916 and 918 electrically drive conductors 122, which are designated by $C_0$ and $C_1$ respectively. In order to avoid overcomplicating FIG. 9, the remaining second conductors 122 and their respective address line conductors have not been labeled with reference numerals. Each conductor from connector 906 is, however, illustrated as connecting to its respective second conductor 122.

For example, a 3D display having a plurality of planes of illumination devices, such as plane 904, will each have a single conductor for providing an electrical signal to their interconnected first conductors 120. However, the second conductors 122 within plane 904 each individually receive an electrical signal from an individual address line conductor (e.g., $C_0$).

FIG. 10 illustrates a flowchart associated with addressing the illumination devices in the 3D display assembly according to an embodiment of the present invention. The flowchart will be described with the aid of FIGS. 6, 7, and 8. At step 1002, the location of each illumination device is provided with a designated address, which identifies its physical location within the 3D display 600 (FIG. 6). Based on the addresses, the processor 804 (FIG. 8) may provide a series of control signals to the shift registers 808. The shift registers 808 may then electrically drive a corresponding set of conductors that are coupled to the addressed illumination devices via connector 810 (FIG. 8). For example, a corresponding set of conductors may carry electrical signals to column 605 (FIG. 6) and planes 602 and 604 (FIG. 6) of the display 600 (FIG. 6) in order to activate the optical devices or illumination sources within illumination devices 608 and 610, respectively. As previously described, multiple illumination devices may be activated within each single plane in order generate a multitude of three-dimensional visual effects known in the art of animation, visual image construction, and graphics. Referring to FIG. 6, for example, by activating the illumination devices within rows 616 and 618 of plane 606 three-dimensional depth information may be provided for generating a desired 3D visual image.

At step 1004, the controller 704 (FIG. 8) receives image data from either input module 806 or memory 802. The image data may be in any graphics-based still or moving image data format. The processor may be programmed to receive and process these variable data formats according to whether the image data is a two-dimensional still image or picture, a series of animated graphics, video images from one or more camera feeds, and/or based on customized programming loaded into the processor 804 for generating a custom designed image in two or three-dimensional form on the 3D display 600 (FIG. 6). At step 1006, the image data is mapped to the plane/column address locations associated with the illumination devices. This mapping may be carried out by processor 804 (FIG. 8) based on the received image data. For example, the mapping may be carried out by assigning data corresponding to each pixel or group of pixels within an image to a corresponding address location associated with any illumination device within the 3D display 600 (FIG. 6). At step 1008, based on this mapping, corresponding illumination devices are activated in the display 600 (FIG. 6) by applying the appropriate signals to the plane/column locations via the shift register unit 808 (FIG. 8) and connector 810 (FIG. 8).

3D depth information may be added as an additional visual effect by the processor 804 (FIG. 8) based on, for example, a received 2D image. Alternatively, the image data may already comprise 3D data, where the mapped data is applied to the appropriate address location within the display 600 (FIG. 6). Also, for example, images generated from two cameras may generate 3D image data for generating a 3D visual display. A first camera may, for example, generate images in an XY coordinate system, while a second camera generates ZY coordinate information for providing depth information to the XY coordinate images. Corresponding XYZ data information from these cameras may then been mapped by the controller 704 (FIG. 8) for generating a 3D display.

FIG. 11 illustrates a circuit diagram of a controller device 1102 associated with the display system according to an embodiment of the present invention. The controller device 1102 comprises a plurality of shift registers 1104 and a microprocessor device 1106 (i.e., PIC 16F874P chip), whereby microprocessor 1106 controls the shift registers 1104.

FIG. 12 is a schematic diagram of a 3D display for creating visual display information based on receiving electrical signals in a scanned manner according to an embodiment of the present invention. FIG. 12 illustrates three planes P1, P2, P3, from a plan view perspective, each comprising four illumination devices. For example, plane P1 includes illumination devices A, B, C, and D; plane P2 includes illumination devices A', B', C', and D'; and plane P3 includes illumination devices A", B", C", and D". FIG. 12 illustrates the electrical connectivity between the device within each of the planes, the connectivity between the planes themselves, and the electrical connectivity associated with the address line conductors that are coupled to the illumination devices. In order to avid over complicating the figure, three planes of a 2×2 array of illumination devices are shown. Based on the application and resolution requirements of the display, P planes of an N×M array may be created, where N=M or N≠M, and N, M, and P are a positive integer (i.e., ≠0).

Within each plane the first conductors 120 of all the illumination devices are interconnected and coupled to an address conductor that provides an electrical signal to all the illumination devices within the plane. For example, within plane P1, the first conductors 120 of devices A, B, C, and D are interconnected and coupled to address line conductor AD1. Also, within plane P2, the first conductors 120 of devices A', B', C', and D' are interconnected and coupled to address conductor AD2. Similarly, within plane P3, the first conductors 120 of devices A", B", C", and D" are interconnected and coupled to address conductor AD3.

Also, the second conductors 122 of all individual illumination devices within each plane are interconnected to all other second conductors 122 of illumination devices within other planes that are within a vertical column. For example, the second conductors 122 of illumination device A of plane P1 is interconnected to the second conductors 122 of illumination devices A' and A" of planes P2 and P3, respectively. The interconnected second conductors 122 of illumination devices A, A' and A" are coupled to address conductor C1. This interconnection between the devices A, A', A" and address line C1 is illustrated by dashed line 1202.

Also, the second conductors 122 of illumination device B of plane P1 is interconnected to the second conductors 122 of illumination devices B' and B" of planes P2 and P3, respectively. The interconnected second conductors 122 of illumination devices B, B' and B" are coupled to address conductor C2. This interconnection between the devices B, B', B" and address line C2 is illustrated by dashed line 1204.

The second conductors 122 of illumination device C of plane P1 is interconnected to the second conductors 122 of illumination devices C' and C" of planes P2 and P3, respectively. The interconnected second conductors 122 of illumination devices C, C' and C" are coupled to address line conductor C3, where the interconnection between the devices C, C', C" and address line C3 is illustrated by dashed line 1206.

Moreover, the second conductors 122 of illumination device D of plane P1 is interconnected to the second conductors 122 of illumination devices D' and D" of planes P2 and P3, respectively. The interconnected second conductors 122 of illumination devices D, D' and D" are coupled to address line conductor C4. This interconnection between the devices D, D', D" and address line C4 is illustrated by dashed line 1208.

According to an aspect of the present invention, the described method of interconnecting the illumination devices reduces the number of required address lines needed to activate the illumination devices. In conventional 3D systems, each illumination device would require an independent series of address lines for facilitating the activation of each illumination device. For example an N×N×N array of devices would require N×N×N address conductors. However, an N×N×N array according to the present invention may only require (N×N)+N address conductors, which heavily reduces the burden, among other things, on wiring, address signaling and complexity, and potential faultfinding capabilities. This reduced conductor configuration may be derived from the scanned method used for accessing the illumination devices within each plane.

The method of addressing specific illumination devices based on, for example, an image data file comprises a scanned method, whereby the specific illumination devices within each plane are addressed, and thus activated, sequentially, plane-by-plane. This sequence may start from the top plane towards the bottom plane, and then repeat the same scanning pattern (i.e., top to bottom) for subsequent image frames in the data file. The scan rate may be controlled to generate a simultaneous image to the human eye. The scan may also be controlled in order to generate any other desired visual effect.

For example, specific illumination devices for generating a visual image are activated (i.e., addressed) by applying an electrical signal to both conductor AD1 and the appropriate address conductors (C1–C4) coupled to the specific illumination devices (A, B, C, and/or D) within plane P1. Once the illumination devices in plane P1 are de-activated, an electrical signal is applied to both conductor AD2 and the appropriate address conductors (C1–C4) associated with the specific illumination devices (A', B', C', and/or D') within plane P2. Following the de-activation of the illumination devices in plane P2, electrical signals are applied to both conductors AD3 and the appropriate address conductors (C1–C4) associated with the specific illumination devices (A", B", C", and/or D") within plane P3. Because conductors C1–C4 are commonly connected to all planes, when these conductors C1–C4 are activated, the plane address lines AD1–AD3 of the active plane is active (e.g., positive voltage), while the address lines associated with the other planes are maintained in an inactive state (e.g., electrically grounded). Once all the planes are activated in the above-described manner, the process repeats, where the illumination devices in planes P1–P3 are activated sequentially based on the image data associated with each frame.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect or import of the methods described.

What is claimed is:

1. An electrical contact assembly for an optical device useable in a three-dimensional optical display, comprising:
   a first conductor comprising
      a first intermediate section,
      a first contact, adapted to couple to a contact of the optical device, associated with the first intermediate section,
      a first pair of tabs extending outwardly in opposite directions with respect to the first intermediate section, and
      a second pair of tabs extending outwardly in opposite directions with respect to the first intermediate section,
      the first and second pair of tabs being spaced about a periphery of the first intermediate section; and
   a second conductor comprising
      a second intermediate section,
      a second contact, adapted to couple to an other contact of the optical device, associated with the second intermediate section of the second conductor, and
      a third pair of tabs extending outwardly in opposite directions with respect to the second intermediate section;
   wherein the first and second conductors are positioned relative to each other so that the first and second pair of tabs, and the third pair of tabs each extend in a different plane and each pair of tabs defines a dimension of the three-dimensional display, and
   the first and second contacts are positioned to receive contacts of the optical device;
   the tabs being adapted to be coupled to tabs of other contact assemblies, whereby the three-dimensional display can be fabricated.

2. The assembly according to claim 1, wherein the optical device comprises a light emitting diode (LED).

3. The assembly according to claim 1, wherein the optical device comprises a liquid crystal display (LCD) device.

4. The assembly according to claim 1, wherein the first and second pair of tabs are positioned within a first plane, and the third pair of tabs are positioned within a second plane.

5. The assembly according to claim 4, wherein the first and second pair of tabs are electrically conductive and are coupled to an other first and second pair of tabs within the first plane.

6. The assembly according to claim 5, wherein the third pair of tabs are electrically conductive and are coupled to an other third pair of tabs within the second plane, whereby the first and the second plane are substantially orthogonal with respect to one another.

7. An electrical contact assembly for an optical device useable in a three-dimensional optical display, comprising:
   a first conductor comprising
      a first intermediate section defining a space which is partially enclosed by the intermediate section,
      a first contact, adapted to couple to a contact of the optical device, associated with the first intermediate section,
      a first pair of tabs extending outwardly in opposite directions with respect to the first intermediate section, and
      a second pair of tabs extending outwardly in opposite directions with respect to the first intermediate section,
      the first and second pair of tabs being spaced about a periphery of the first intermediate section; and
   a second conductor comprising
      a second intermediate section defining a space which is partially enclosed by the second intermediate section,
      a second contact, adapted to couple to another contact of the optical device, associated with the second intermediate section of the second conductor, and a third pair of tabs extending outwardly in opposite directions with respect to the second intermediate section;
   wherein the first and second conductors are positioned relative to each other so that the first and second pairs of tabs, and the third pair of tabs each extend in a different plane and each pair of tabs defines a dimension of the three-dimensional display, and wherein the first and second contacts are positioned to receive contacts of the optical device, the tabs being adapted to be coupled to tabs of other contact assemblies, whereby the three-dimensional display can be fabricated.

8. The assembly according to claim 7, wherein the optical device comprises a light emitting diode (LED).

9. The assembly according to claim 7, wherein the optical device comprises a liquid crystal display (LCD) device.

10. An assembly for creating a three-dimensional display, comprising:
   a first conductor including a first and a second tab separated by a first intermediate section therebetween, and a third and forth tab separated by a second intermediate section therebetween, wherein the first and second intermediate section comprise a common intermediate section and the first and second tab are substantially perpendicular to the third and fourth tab, wherein the first and fourth tab are separated by an opening; and a second conductor including a fifth and a six tab separated by a third intermediate section therebetween, wherein the second conductor is substantially perpendicular with respect to the first conductor such that the third intermediate section passes between the opening;

wherein the first and second conductor each form an electrical connection for activating one or more illumination sources.

11. The assembly according to claim 10, wherein the common intermediate section comprises at least one first contact for receiving at least one first conductive pin associated with the one or more illumination sources, and the third intermediate section comprises at least one second contact for receiving at least one second conductive pin associated with the one or more illumination sources, wherein the one or more illumination sources receive electrical current through the first and the second contact.

12. The assembly according to claim 10, wherein the one or more illumination sources comprises a light emitting diode (LED).

13. The assembly according to claim 10, wherein the first intermediate section comprises at least one first contact for receiving at least one first conductive pin associated with the one or more illumination sources, and the third intermediate section comprises at least one second contact for receiving at least one second conductive pin associated with the one or more illumination sources, wherein the one or more illumination sources receive electrical current through the first and the second contact.

14. The assembly according to claim 13, wherein the one or more illumination sources comprises a light emitting diode (LED).

15. The assembly according to claim 10, wherein the second intermediate section comprises at least one first contact for receiving at least one first conductive pin associated with the one or more illumination sources, and the third intermediate section comprises at least one second region for receiving at least one second conductive pin associated with the one or more illumination sources, wherein the one or more illumination sources receive electrical current through the first and the second contact.

16. The assembly according to claim 15, wherein the one or more illumination sources comprises a light emitting diode (LED).

17. The assembly according to claim 10, wherein the first conductor is electrically conductive.

18. The assembly according to claim 10, wherein the second conductor is electrically conductive.

19. The assembly according to claim 10, wherein the first conductor and the second conductor are electrically isolated.

20. The assembly according to claim 10, wherein the first, second, third, and forth tab each comprise an end portion for connectively coupling an other first conductor to the end portion of one of the first, second, third, or forth tab of the first conductor, wherein the connectively coupled end portion provides electrical conductivity.

21. The assembly according to claim 20, wherein the fifth and sixth tab each comprise an other end portion for connectively coupling an other second conductor to the other end portion of one of the fifth or sixth section of the second conductor, wherein the connectively coupled other end portion provides electrical conductivity.

22. The assembly according to claim 10, further comprising a casing for diffusing light generated by the one or more illumination sources, wherein the casing is attached to the first conductor.

23. The assembly according to claim 10, further comprising a casing for diffusing light generated by the one or more illumination sources, wherein the casing is attached to the second conductor.

24. A method of connecting a plurality of illumination sources in a three-dimensional display, comprising:

providing an electrically conductive first conductor located in a first plane for coupling to at least one first connection of an electrical component;

providing an electrically conductive second conductor located in a second plane for coupling to at least one second connection of the electrical component;

coupling a first end portion associated with the first conductor to an other first end portion associated with an other first conductor adjacent the first conductor; and coupling a second end portion associated with the second conductor to an other second end portion associated with an other second conductor adjacent the second conductor.

25. The method according to claim 24, wherein the first and second plane are substantially orthogonal.

26. The method according to claim 24, wherein the electrical component is activated by applying electrical signals to the first and second conductor.

27. The method according to claim 24, wherein the coupled first conductor and the adjacent other first conductor comprise an electrically conductive relationship.

28. The method according to claim 24, wherein the coupled second conductor and the adjacent other second conductor comprise an electrically conductive relationship.

* * * * *